United States Patent Office 3,141,903
Patented July 21, 1964

3,141,903
ETHYLENICALLY UNSATURATED PHENYL SALICYLATE DERIVATIVES
Joseph Fertig and Martin Skoultchi, New York, N.Y., and Albert I. Goldberg, Berkeley Heights, N.J., assignors to National Starch and Chemical Corporation, New York, N.Y., a corporation of Delaware
No Drawing. Filed Nov. 6, 1961, Ser. No. 150,154
3 Claims. (Cl. 260—473)

This invention relates to the preparation of ethylenically unsaturated derivatives of phenyl salicylate as well as to the novel derivatives thus prepared.

It is the object of this invention to produce a novel class of ethylenically unsaturated phenyl salicylate derivatives which are capable of undergoing vinyl type polymerization reactions either alone or in the presence of other vinyl type comonomers. A further object of this invention involves the preparation of polymerizable phenyl salicylate derivatives which can be incorporated into a wide variety of polymers and copolymers so as to provide such polymers with improved heat and light stability.

The novel compositions of our invention are the ethylenically unsaturated phenyl or substituted phenyl salicylate derivatives corresponding to the formulae:

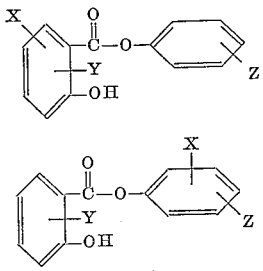

where X represents an ethylenically unsaturated group selected from the class consisting of acrylyloxy, acrylyloxyalkyl, methacrylyloxy, and methacrylyloxyalkyl groups and Y and Z represent at least one member of the class consisting of hydrogen, alkyl, aryl, acyloxy, aralkyl, or halogen radicals.

As representative of the phenyl salicylate derivatives of our invention, one may list phenyl 2-hydroxy-4-acrylyloxy benzoate; phenyl 2-hydroxy-5-acrylyloxy benzoate; phenyl 2-hydroxy-5-acrylyloxymethyl benzoate; phenyl-2-hydroxy-4-methacrylyloxy benzoate; phenyl 2-hydroxy-5-methacrylyloxy benzoate; and phenyl 2 - hydroxy - 5-methacrylyloxymethyl benzoate; and para - acrylyloxy-methyl phenyl-2-hydroxybenzoate. Thus, it is to be seen that the derivatives of our invention may be described as the acrylyloxy, methacrylyloxy, acrylyloxyalkyl, and methacrylyloxyalkyl derivatives of phenyl salicylates. They may also be referred to as the ethylenically unsaturated derivatives of phenyl ortho-hydroxy benzoate esters. Each of the above listed derivatives may, in turn, contain a variety of other substituent groups including halogen, alkyl aryl, acyloxy, and aralkyl groups wherein these latter groups may be substituted on either of the phenyl rings in the phenyl salicylate moiety.

All of the above listed compounds, as well as any others which may correspond to the above described formula, are materials which are capable of readily undergoing vinyl type polymerization. They are thus useful for the preparation of homopolymers and, more particularly, for the preparation of copolymers with a wide variety of other vinyl type monomers. As is noted in our copending application, Serial No. 150,197, filed November 6, 1961, and assigned to the assignee of the subject application, these copolymers are especially outstanding in regard to their superior light stability. This improved stability is imparted to these copolymers as a result of the presence therein of the phenyl salicylate moiety which is permanently bound into and inherently part of the resulting copolymer molecule as a result of the incorporation therein of the ethylenically unsaturated phenyl salicylate derivatives of our invention.

Other ethylenically unsaturated acids which are capable of undergoing vinyl type polymerization, such as fumaric, maleic, itaconic, citraconic, and crotonic acids, etc., can also be used to prepare polymerizable phenyl salicylate derivatives. However, the phenyl salicylate derivatives of the latter unsaturated acids do not lend themselves to the preparation of homopolymers and are not as versatile in their ease of incorporation into a wide variety of vinyl copolymers. For these reasons we prefer the acrylic or methacrylic acid derivatives of phenyl salicylate. It is also possible to prepare polymerizable vinyl monomers, containing the phenyl salicylate moiety, from unsaturated alcohols such as allyl or vinyl alcohol. This may be accomplished, for example, by esterifying the hydroxyl group on the number 4 position of phenyl 2,4-dihydroxy benzoate with a dibasic acid anhydride and then esterifying the residual carboxyl group with a vinyl or allyl group by means of ester interchange or alcoholysis.

The synthesis of our novel phenyl salicylate derivatives varies to some extent according to the type of phenyl salicylate moiety which is being derivatized. Thus, in preparing the acrylyloxy and methacrylyloxy derivatives, the procedure which is most conveniently utilized consists in brief, of the reaction of any acrylyl or methacrylyl halide, particularly the chloride, with either the phenyl 2,4 or 2,5-dihydroxy benzoate so as to yield the corresponding phenyl 2-hydroxy-4-acrylyloxy or methacrylyloxy benzoate or the phenyl 2-hydroxy-5-acrylyloxy or methacrylyloxy benzoate.

This reaction is ordinarily conducted by dissolving the phenyl dihydroxy benzoate in an appropriate inert solvent such as benzene or toluene. There should also be present in the initial reaction mixture an acid acceptor, such as a tertiary amine, which will combine with the hydrochloric acid or other acid which is liberated during the course of the reaction. In addition, a small amount of a polymerization inhibitor, such as hydroquinone or the monomethyl ether of hydroquinone is added so as to prevent any spontaneous polymerization of the desired reaction products which, as noted earlier, are capable of undergoing vinyl type polymerization. The addition of the acrylyl or methacrylyl halide is best accomplished on a dropwise basis while the reaction mixture is being cooled in an ice bath. When the addition of the acid halide is complete, the mixture is agitated for an additional period and is then acidified. The organic layer is separated, washed with additional portions of acid and finally with water. After removing residual water with a dessicant, the solvent may be removed under vacuum at room temperature yielding a crude liquid which cannot be readily distilled without decomposition. With respect to proportions, it should be noted that the various reactants, including the acid acceptor, should be present on a molar equivalent basis while the polymerization inhibitor should be present in a concentration amounting to about 0.01 to 0.40% of the weight of the phenyl dihydroxy benzoate which is present in the initial reaction mixture. By means of the above described procedure, the acrylyloxy and methacrylyloxy phenyl salicylate derivatives are produced in almost quantitative yields.

The intermediates for the above described reaction, i.e. the phenyl 2,4 or 2,5-dihydroxy benzoates, are prepared by the reaction of phenol with resorcyclic and gentisic acids, respectively, in the presence of phosphorus oxychloride. The preparation of these intermediates does not, it should be noted, comprise a novel aspect of the process of our invention. By starting with substituted phenols and/or substituted resorcyclic and gentisic acids, it is of course possible, as noted earlier, to prepare the resulting acryiyloxy or methacrylyloxy derivatives with a variety of halogen, alkyl, aryl, acyloxy, or aralkyl substituents.

As for the acrylyloxyalkyl and methacrylyloxyalkyl phenyl salicylate derivatives, a typical procedure for their preparation would involve the reaction of an alkali metal salt, and particularly the sodium salt, of acrylic or methacrylic acid, with phenyl 2-hydroxy-5-chloromethyl benzoate. This reaction is conducted by dissolving the latter compound in an appropriate solvent such as methyl ethyl ketone or acetone. This is followed by the addition of the acrylate or methacrylate salt as well as a basic catalyst such as triethyl amine. A polymerization inhibitor should also be present so as to prevent the spontaneous polymerization of the desired end product. Following the initial exothermic reaction, the mixture is maintained under agitation for an additional period of time. At the completion of the reaction, the solids are removed by filtration and the organic filtrate is then concentrated, under reduced pressure, at room temperature. The various reactants should all be present in molar equivalents while the concentration of polymerization inhibitor should be in the range of about 0.01 to 0.40%, by weight, of the phenyl 2-hydroxy-5-chloromethyl benzoate. By means of this reaction, the acrylyloxymethyl and methacrylyloxymethyl phenyl salicylate derivatives are produced in almost quantitative yields.

The intermediate for the above reaction, i.e. the phenyl 2-hydroxy-5-chloromethyl benzoate, may be prepared by the chloromethylation of phenyl salicylate by reacting the latter with concentrated hydrochloric acid and paraformaldehyde in the presence of a typical chloromethylation catalyst such as zinc chloride. Once again it should be stated that the preparation of this intermediate does not constitute a novel aspect of the process of our invention. It is also possible, by starting with a substituted phenyl salicylate, to prepare the resulting acrylyloxyalkyl or methacrylyloxyalkyl derivatives with a variety of halogen, alkyl, aryl, acyloxy or aralkyl substituents.

A convenient method for attaching an acrylyloxyalkyl or methacrylyloxyalkyl group to the phenyl moiety rather than to the salicylate moiety of the phenyl salicylate molecule involves the use of a reagent such as para-cresyl salicylate as the intermediate. The methyl group of this reagent can be chlorinated, e.g. using sulfuryl chloride, to give para-chloromethyl phenyl salicylate which may then be converted into the desired derivative by reaction with the sodium salt of either acrylic or methacrylic acid according to the above described procedure.

The following examples will further illustrate the embodiment of this invention. In these examples all parts given are by weight unless otherwise noted.

*Example I*

This example illustrates the preparation of phenyl 2-hydroxy-4-acrylyloxy benzoate by means of the process of our invention.

In a reaction vessel, 184.0 parts of phenyl 2,4-dihydroxy benzoate were dissolved in a mixture of 96.8 parts of N,N-dimethyl aniline and 80.0 parts of benzene. To this solution 0.55 part of hydroquinone were added as a polymerization inhibitor and the entire reaction mixture was then placed in an ice bath. With agitation, 72.4 parts of acrylyl chloride were then added dropwise over a one hour period. When the addition of the acrylyl chloride was complete, the mixture was agitated for an additional 2 hours whereupon the solution was acidified with 6.0 N hydrochloric acid and the organic layer separated. The latter was then washed, in turn, with equal volumes of 6.0 N and 1.0 N hydrochloric acid and finally with 3 portions of distilled water. After drying the organic layer over a dessicant, the solvent was removed under vacuum at room temperature thus yielding 215 parts, or about 95% of the theoretical yield, of crude liquid phenyl 2-hydroxy-4-acrylyloxy benzoate which, by saponification equivalent, indicated a purity of better than 96%.

*Example II*

This example illustrates the preparation of phenyl 2-hydroxy-4-methacrylyloxy benzoate by means of the process of our invention.

In a reaction vessel, 184.0 parts of phenyl 2,4-dihydroxy benzoate were dissolved in a mixture of 96.8 parts of N,N-dimethyl aniline and 80.0 parts of benzene. To this solution 0.55 part of hydroquinone were added as a polymerization inhibitor and the entire reaction mixture was then placed in an ice bath. With agitation, 83.6 parts of methacrylyl chloride were then added dropwise over a one hour period. When the addition of the methacrylyl chloride was complete, the mixture was agitated for an additional 2 hours whereupon the solution was acidified with 6.0 N hydrochloric acid and the organic layer separated. The latter was then washed, in turn, with equal volumes of 6.0 N and 1.0 N hydrochloric acid and finally with 3 portions of distilled water. After drying the organic layer over a dessicant, the solvent was removed under vacuum at room temperature thus yielding 226.0 parts, or about 95% of the theoretical yield, of crude liquid phenyl 2-hydroxy-4-methacrylyloxy benzoate which, by saponification equivalent, indicated a purity of better than 95%.

*Example III*

This example illustrates the preparation of phenyl 2-hydroxy-5-acrylyloxy benzoate by means of the process of our invention.

In a reaction vessel, 184.0 parts of phenyl 2,5-dihydroxy benzoate were dissolved in a mixture of 96.8 parts of N,N-dimethylaniline and 80.0 parts of benzene. To this solution 0.55 part of hydroquinone were added as a polymerization inhibitor and the entire reaction mixture was then placed in an ice bath. With agitation, 72.4 parts of acrylyl chloride were then added dropwise over a one hour period. When the addition of the acrylyl chloride was complete, the mixture was agitated for an additional 2 hours whereupon the solution was acidified with 6.0 N hydrochloric acid and the organic layer separated. The latter was then washed, in turn, with equal volumes of 6.0 N and 1.0 N hydrochloric acid and finally with 3 portions of distilled water. After drying the organic layer over a dessicant, the solvent was removed under vacuum at room temperature thus yielding 220.0 parts, or about 97% of the theoretical yield of crude liquid phenyl 2-hydroxy-5-acrylyloxy benzoate which, by saponification equivalent, indicated a purity of better than 96%.

*Example IV*

This example illustrates the preparation of phenyl 2-hydroxy-5-methacrylyloxy benzoate by means of the process of our invention.

In a reaction vessel 184.0 parts of phenyl 2,5-dihydroxy benzoate were dissolved in a mixture of 96.8 parts of N,N-dimethyl aniline and 80.0 parts of benzene. To this solution 0.55 part of hydroquinone were added as a polymerization inhibitor and the entire reaction mixture was then placed in an ice bath. With agitation, 83.6 parts of methacrylyl chloride were then added dropwise over a one hour period. When the addition of the methacrylyl chloride was complete, the mixture was agitated for an additional 2 hours whereupon the solution was acidified with 6.0 N hydrochloric acid and the organic layer separated. The latter was then washed, in turn, with equal volumes of 6.0 N and 1.0 N hydrochloric acid and finally with 3 portions of distilled water. After drying the organic layer over a dessicant, the solvent was removed under vacuum at room temperature thus yielding 222.0 parts, or about 93% of the theoretical yield, of crude liquid phenyl 2-hydroxy-5-methacrylyloxy benzoate which, by saponification equivalent, indicated a purity of better than 94%.

Example V

This example illustrates the preparation of phenyl 2-hydroxy-5-acrylyloxymethyl benzoate by means of the process of our invention.

In a reaction vessel, 83.0 parts of phenyl 2-hydroxy-5-chloromethyl benzoate were dissolved in 83.0 parts of methyl ethyl ketone. To this solution there was then added 31.0 parts of sodium acrylate, 2.5 parts of triethyl amine and 0.36 part of monomethyl ether of hydroquinone. After the initial exothermic reaction, the resultant slurry was heated, under agitation, to a temperature in the range of 50–60° C. and maintained at that level for a period of 4 hours. When the reaction was complete, the solids were removed by filtration and the organic filtrate concentrated, at room temperature, under reduced pressure thus giving an almost quantitative yield of 86.5 parts of liquid phenyl 2-hydroxy-5-acrylyloxymethyl benzoate. By saponification equivalent, this crude liquid indicated a purity of better than 94%.

Example VI

This example illustrates the preparation of phenyl 2-hydroxy-5-methacrylyloxymethyl benzoate by means of the process of our invention.

In a reaction vessel, 83.0 parts of phenyl 2-hydroxy-5-chloromethyl benzoate were dissolved in 83.0 parts of methyl ethyl ketone. To this solution there was then added 35.6 parts of sodium methacrylate, 2.5 parts of triethyl amine and 0.36 part of the monomethyl ether of hydroquinone. After the initial exothermic reaction, the resultant slurry was heated, under agitation to a temperature in the range of 55–60° C. and maintained at that level for a period of 4 hours. When the reaction was complete, the solids were removed by filtration and the organic filtrate concentrated, at room temperature, under reduced pressure thus giving an almost quantitative yield of 93.0 parts of liquid phenyl 2-hydroxy-5-methacrylyloxymethyl benzoate. By saponification equivalent, this crude liquid indicated a purity of better than 92%.

Summarizing, our invention is thus seen to provide a novel class of ethylenically unsaturated derivatives of phenyl salicylate. Variations may be made in proportions, procedures and materials without departing from the scope of this invention defined by the following claims.

We claim:

1. An ethylenically unsaturated phenyl salicylate derivative selected from the group consisting of:
Phenyl 2-hydroxy-5-acrylyloxymethyl benzoate, and
Phenyl 2-hydroxy-5-methacrylyloxymethyl benzoate.
2. Phenyl 2-hydroxy-5-acrylyloxymethyl benzoate.
3. Phenyl 2-hydroxy-5 - methacrylyloxymethyl benzoate.

References Cited in the file of this patent

UNITED STATES PATENTS

| | | |
|---|---|---|
| 2,545,044 | Reynolds et al. | Mar. 13, 1951 |
| 2,910,454 | Clark et al. | Oct. 27, 1959 |
| 2,938,883 | Raich | May 31, 1960 |